(12) United States Patent
Daouk

(10) Patent No.: US 9,150,141 B2
(45) Date of Patent: Oct. 6, 2015

(54) COUPLING DEVICE WITH THE OPTION OF MOVING LONGITUDINALLY

(76) Inventor: Antar Daouk, Paris (FR)

(*) Notice: Subject to any disclaimer, the term of this patent is extended or adjusted under 35 U.S.C. 154(b) by 476 days.

(21) Appl. No.: 12/798,606

(22) Filed: Apr. 6, 2010

(65) Prior Publication Data

US 2010/0260541 A1     Oct. 14, 2010

(30) Foreign Application Priority Data

Apr. 6, 2009    (FR) .................................... 09 52245

(51) Int. Cl.
B60P 7/08        (2006.01)

(52) U.S. Cl.
CPC .............. B60P 7/0815 (2013.01); *Y10T 403/59* (2015.01)

(58) Field of Classification Search
USPC ........ 403/321, 322.1, 322.4, 350, 409.1, 264, 403/252, 256, 257; 244/118.6, 122 R, 244/118.1; 296/65.05; 248/503.1
See application file for complete search history.

(56) References Cited

U.S. PATENT DOCUMENTS

| | | | | |
|---|---|---|---|---|
| 4,047,689 A * | 9/1977 | Grendahl | ....................... | 410/105 |
| 4,056,196 A * | 11/1977 | Brauning | ....................... | 211/207 |
| 4,109,891 A * | 8/1978 | Grendahl | ................... | 248/503.1 |
| 4,128,217 A * | 12/1978 | Mazelsky | .................. | 244/122 R |
| 4,213,593 A * | 7/1980 | Weik | ............................ | 248/501 |
| 4,277,043 A * | 7/1981 | Weik | ........................... | 248/503.1 |
| 4,376,522 A * | 3/1983 | Banks | ......................... | 248/503.1 |
| 4,396,175 A * | 8/1983 | Long et al. | ................. | 248/503.1 |
| 4,449,875 A * | 5/1984 | Brunelle | ......................... | 410/80 |
| 4,500,020 A * | 2/1985 | Rasor | ............................ | 224/321 |
| 4,856,738 A * | 8/1989 | Martin | ....................... | 244/122 R |
| 7,144,184 B1 * | 12/2006 | Tsai | ............................... | 403/350 |
| 7,303,361 B1 * | 12/2007 | Lane | ............................... | 405/287 |
| 7,594,787 B2 * | 9/2009 | Womack et al. | ............. | 410/104 |
| 7,785,053 B2 * | 8/2010 | Hudson | ......................... | 410/105 |
| 2010/0301164 A1* | 12/2010 | Hudson | ...................... | 244/118.6 |

FOREIGN PATENT DOCUMENTS

FR            2912993 A1 *   8/2008
WO    WO 2007133823 A1 *  11/2007

OTHER PUBLICATIONS

Search report issued Dec. 17, 2009 in connection with French Application No. FR 0952245.

* cited by examiner

*Primary Examiner* — Daniel Wiley
(74) *Attorney, Agent, or Firm* — John P. White; Cooper & Dunham LLP

(57)  ABSTRACT

A coupling device (1) comprises an attachment (6) capable of varying between an attachment configuration and a release configuration, said coupling device (1) being characterized in that it further comprises a support member (7) designed to vary between an in-use configuration in which it supports the weight of said coupling device (1) while allowing it to move, and secondly a rest position in which it does not support the weight of said coupling device (1), the attachment (6) and the support member (7) being designed to vary between their respective configurations independently of each other.

17 Claims, 3 Drawing Sheets

COUPLING DEVICE WITH THE OPTION OF MOVING LONGITUDINALLY

This application claims priority of French patent application no. FR-09 52245, filed Apr. 6, 2009, the contents of which are hereby incorporated by reference.

The present invention relates to the general technical field of coupling devices that enable a piece of equipment to be releasably attached to a rail that is itself on board a vehicle. In particular, the present invention relates to the field of quickly coupling pieces of equipment (such as seats, on-board kitchen elements, etc.) to rails that are fastened in aircraft such as helicopters or airplanes.

More particularly, the present invention relates to a coupling device for coupling to a rail on board a vehicle, said device comprising attachment means capable of varying between firstly an attachment configuration in which the attachment means are designed to attach the coupling device to the rail, and secondly a release configuration in which the attachment means are designed to allow said coupling device and said rail to be separated.

It is known to fit aircraft with rails that enable on-board equipment (e.g. seats, carts, pods, stretchers, etc.) to be attached reversibly and quickly. The design of such rails complies with international standards, such that said rails are standardized, at least in terms of their general shape. Thus, these rails usually comprise an attachment wall that extends longitudinally along the top of the rail, said attachment wall presenting an inside face situated facing the floor to which the rail is secured, and an opposite outside face. An opening is provided through the attachment wall so as to pass therethrough between the inside and outside faces in a through direction that generally corresponds to the vertical direction.

The opening extends longitudinally in the main direction in which the rail extends and is thus in the form of a slot. The section of the slot is constant, with the exception of localized portions positioned at regular intervals and that present an enlarged circular section. These portions of enlarged section are often referred to in this technical field as "cells". Various coupling devices exist in the prior art that enable a piece of equipment to be secured to a rail complying with the above description. In particular, a coupling device is known that comprises a base having mounted thereon:

a horizontal blocking part designed to be inserted in a cell of the rail to prevent any movement of the coupling device in the plane in which the rail extends; and a vertical blocking part mounted to move in longitudinal translation on the coupling device in order to wedge against the rail. Given the particular mechanical constraints (vibration) to which the coupling is subjected within an aircraft, it is necessary to provide for the coupling device to be secured firmly to the rail. For this purpose, at the end of its movement in longitudinal translation, the vertical blocking part is designed to be subjected to movement having a vertical component so that it is brought to press against the inside face of the attachment wall of the rail, thereby providing a firm mechanical connection between the rail and the coupling device.

The operation of that known device is as follows. The base is placed against and on the attachment wall so that the horizontal and vertical blocking parts penetrate into corresponding cells. The coupling device is then already blocked against movement in horizontal translation. The vertical blocking part is then subjected to forward longitudinal movement relative to the base through an amplitude that corresponds to half the diameter of a cell. That enables an offset to be established between the vertical blocking part and the cell, thereby enabling the coupling device to be locked vertically to the rail. Finally, the vertical blocking part is subjected to (upwards) vertical movement so as to obtain an anti-vibration effect as mentioned above. The coupling device thus enables personnel in charge of making arrangements in the airplane to position various pieces of equipment (seats, carts, on-board kitchen elements, etc.) in selected positions along the rail, in order to take account of operating constraints applicable to the aircraft having the rails secured to its floor.

Nevertheless, those prior art coupling devices present certain drawbacks.

In particular, it is extremely awkward for personnel in charge of arranging the cabin to adjust the longitudinal position of the coupling device (and of the equipment it carries) on the rail. Changing the longitudinal position of the coupling device relative to the rail requires various operations to be performed that are time-consuming, difficult, and possibly even physically tiring, depending on the weight of the piece of equipment concerned. These operations consist in particular in moving the vertical blocking part vertically (downwards) and then longitudinally rearwards in order to release the coupling device in the vertical direction, followed by the operator lifting the coupling device (which also implies lifting the associated piece of equipment, if any, which equipment may be very heavy) in order to completely disengage the coupling device from the rail, and then in the user (or several users depending on the weight of the equipment concerned) carrying the coupling device to the new desired position.

Those prior art coupling devices are therefore lengthy and wearisome to operate, and that constitutes a serious handicap, given the operating constraints on aircraft, where such constraints involve frequent and major modification to the internal arrangements of cabins.

Furthermore, the design of those prior art devices is relatively complex and expensive given the level of functionality they provide.

Consequently, the objects given to the invention seek to remedy the above-described drawbacks of the prior art and to propose a novel coupling device that, while being of a design that is particularly simple, reliable, and inexpensive, enables a user to proceed easily and quickly with accurate adjustment of the longitudinal position of the coupling device on the corresponding rail.

Another object of the invention seeks to propose a novel coupling device that enables a user to move the coupling device along the rail easily and without effort.

Another object of the invention seeks to propose a novel coupling device of construction that is particularly simplified and compact.

Another object of the invention seeks to propose a novel coupling device that is particularly robust.

Another object of the invention seeks to propose a novel coupling device of design that enables the physical forces to be exerted by the user to be limited.

Another object of the invention seeks to propose a novel coupling device of construction that is particularly reliable and inexpensive.

Another object of the invention seeks to propose a novel coupling device that enables coupling to be provided that is particularly stable and robust.

Another object of the invention seeks to propose a novel coupling device that is easy and intuitive to use.

Another object of the invention seeks to propose a novel coupling device that is capable of being adapted to rails of different dimensions.

The objects given to the invention are achieved with the help of a coupling device for coupling to a rail on board a vehicle, said device comprising:

attachment means capable of varying between firstly an attachment configuration in which the attachment means are designed to attach the coupling device to the rail, and secondly a release configuration in which the attachment means are designed to allow said coupling device and said rail to be separated;

a support member designed to vary between firstly an in-use configuration in which it is designed to be in contact with the rail to support substantially at least a fraction of the weight of said coupling device while allowing it to move along the rail, and secondly a rest configuration in which it substantially does not support the weight of said coupling device, the attachment means and the support member being designed to move between their respective configurations independently of each other; and a main body carrying the attachment means and the support member;

said device being characterized in that the support member is mounted to move relative to the main body between a rest position, corresponding to the rest configuration, and an in-use position corresponding to the in-use configuration.

Other objects and advantages of the invention appear in greater detail on reading the following description and with the help of the accompanying drawings given purely by way of non-limiting illustration, in which.

The invention relates to a coupling device 1 for coupling to a rail 2, said rail 2 being on board a vehicle (not shown).

Preferably, the coupling device 1 constitutes a device for coupling to a rail 2 on board an aircraft, such as an airplane or a helicopter, for example. Below, for reasons of simplicity and concise description, reference is made solely to a device 1 that is specifically designed to be coupled to a rail 2 on board an aircraft, it being understood that the invention is not limited to this preferred aviation application and that it may equally well be used in a land or water-borne vehicle. The device 1 is preferably a quick-coupling device, enabling a user to couple and uncouple the device 1 manually and at will, using no more than the user's own physical strength. Preferably, coupling and uncoupling can be performed by the user without using a tool, merely by directly manipulating control members incorporated in the device 1. In this preferred circumstance, the device is thus a self-coupling device. The device 1 is itself designed to be secured by any appropriate means known in this field to a piece of equipment that it is desired to attach to the rail 2, e.g. a seat, a cart, or a on-board kitchen element. The coupling device 1 thus forms a fastener interface between a piece of equipment that is to be installed in the vehicle, and the rail 2.

In known manner, the rail 2 with which the coupling device 1 is preferably designed to co-operate comprises a web 2A for fitting and fastening to the vehicle, e.g. on a floor thereof. From the sides of said web 2A there extend two parallel side walls 2B and 2C that are themselves covered by an attachment wall 2D that preferably extends substantially parallel to the web 2A. The attachment wall 2D presents both an inside face 20D that faces the web 2A and an outside face 21D that faces in the opposite direction to said inside face 20D.

Figures 5, 6:
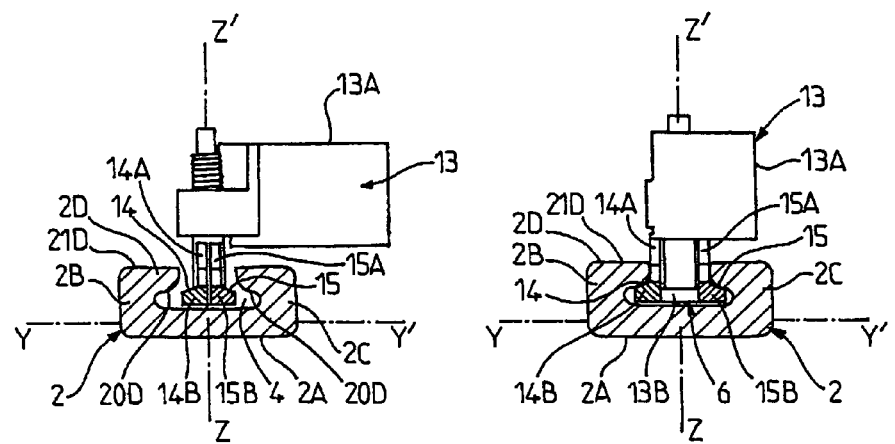
FIGS. 5 and 6 are cross-section views showing co-operation between the rail and the attachment means of the device of the above figures respectively when the attachment means are in the release configuration and in the attachment configuration.

The rail 2 also includes a through opening 3 passing through the attachment wall 2D between said inside and outside faces 20D and 21D, being pierced in a through direction Z-Z' (cf. FIGS. 5 and 6). In other words, the opening 3 passes right through the attachment wall 2D and thus gives access from the outside to the inside volume 4 of the rail 2 as defined together by the web 2A, the side walls 2B and 2C, and the attachment wall 2D. When the rail 2 is secured to a horizontal floor, the through direction Z-Z' corresponds to the vertical direction. This through direction Z-Z' is perpendicular to the longitudinal direction X-X' corresponding to the main direction in which the rail 2 extends. In the meaning of the invention, the transverse direction Y-Y' corresponds to a direction that is perpendicular both to the through direction Z-Z' (vertical direction) and to the longitudinal direction X-X'. Preferably, and as shown in the figures, the opening 3 is of elongate shape extending longitudinally in the main extension direction X-X' of the rail 2, said openings 3 presenting portions 3A of enlarged section (cells) disposed at regular intervals along the rail 2, the portions 3A of enlarged section being connected to one another by rectilinear portions 3B. In other words, the opening 3 is advantageously in the form of a long slot extending parallel to the main direction X-X' in which the rail 2 extends, with the section of said slot in a horizontal plane (i.e. a plane parallel to the inside and outside faces 20D and 21D) varying in regular manner in the longitudinal direction, preferably so as to form enlarged openings (cells) of circular (or pseudo-circular section) corresponding to the portions 3A of enlarged section, said cells being connected together by rectilinear slots corresponding to the portions 3B. Such a construction for a rail is itself well known, in particular in the aviation sector, so it does not need to be described in greater detail herein.

The coupling device 1 has a main body 5 that is preferably designed to be fitted on the outside face 21B of the attachment wall 2D of the rail 2. In other words, the main body 5 is advantageously designed to rest directly against the outside face 21D so as to overlie the opening 3.

The coupling device 1 also includes attachment means 6 capable of varying between an attachment configuration (shown in particular in FIG. 6) in which the attachment means 6 are designed to attach the coupling device 1 to the rail 2, and a release configuration in which the attachment means 6 are designed to allow the coupling device 1 to be separated from the rail 2. In other words, when in the attachment configuration (and when the coupling device 1 is in its functional position, i.e. fitted on and against the rail 2 as shown in FIGS. 1 to 3, 7, and 8), the attachment means 6 serve to assemble the device 1 to the rail 2 so that it is not possible to separate the coupling device 1 from the rail 2 without causing the attachment means 6 to take on its release configuration. Thus, the attachment means 6 are designed to secure the coupling device 1 to the rail 2 when the attachment means are in the attachment configuration. Conversely, when in the release configuration, the attachment means 6 are designed to enable coupling devices 1 and the rail 2 to be freely separated.

The coupling device 1 also has a support member 7 designed to vary between an in-use configuration (shown in FIGS. 7 and 8 for the first embodiment and in FIG. 9 for the second embodiment) in which it is designed to be in contact with the rail 2 so as to support substantially at least a fraction of the weight of the coupling device 1, while allowing it to move along the rail 2 in the longitudinal direction X-X', and a rest configuration (shown in FIGS. 1 and 3), in which the support member 7 substantially does not support the weight of said coupling device 1. In other words, the in-use configuration is a configuration in which the support is active, i.e. firstly it supports the coupling device 1, and secondly it generates a contact interface between the device and the rail 2 that makes it possible, and preferably easy, to move the coupling device 1 longitudinally along the rail 2, e.g. by the user exerting a manual force on the coupling device 1.

Advantageously, and as shown in the figures, the support member 7 is designed to support substantially the entire weight of the coupling device 1 when in its in-use configuration so as to make it easier to move the coupling device 1 along the rail 2, thus enabling the user to adjust the position of the device 1 relative to the rail 2 easily and without effort.

Figure 7:
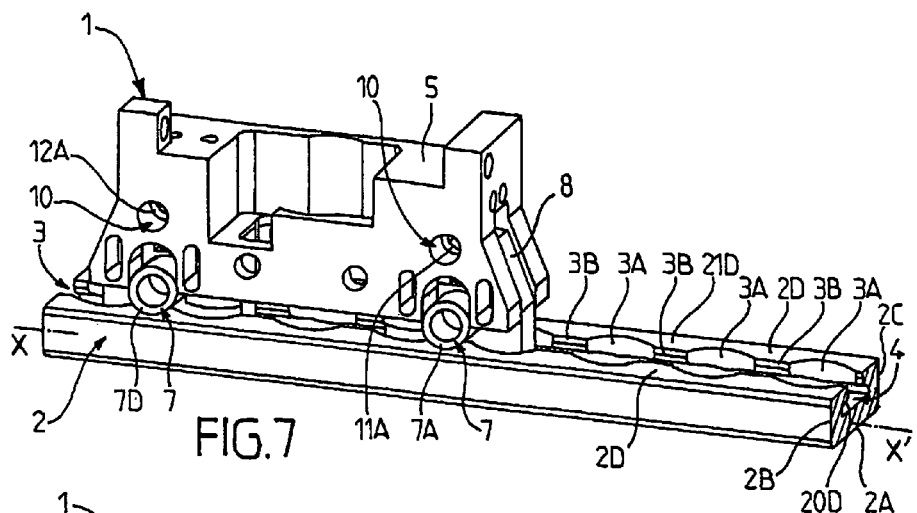
FIG. 7 is a diagrammatic perspective view showing the device of FIGS. 1 to 6 with its support member in its in-use configuration.
Figure 8:
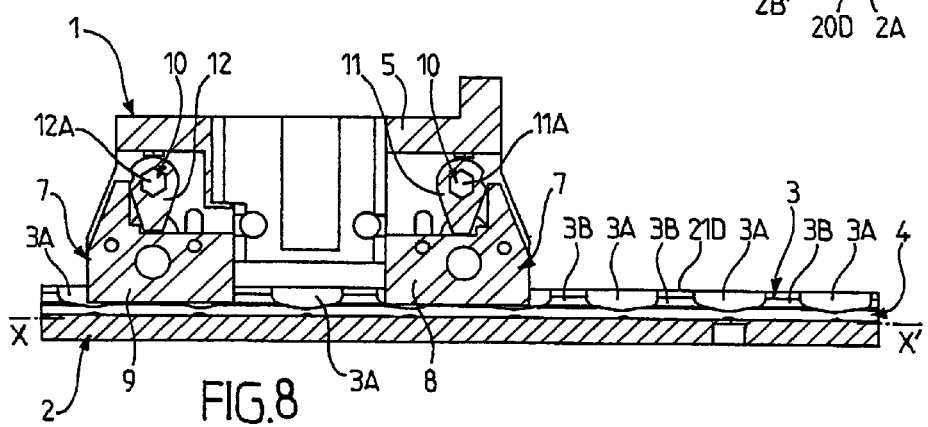
FIG. 8 is a diagrammatic section view on line B-B showing the device of the above figures with its support member in the in-use configuration.

For this purpose, the support member 7 preferably includes at least one wheel, and preferably includes four wheels 7A, 7B, 7C, and 7D forming a wheel set, so as to enable the device 1 to run along the rail 2, and preferably on the outside face 21D, when the support member 7 is in it in-use configuration, as shown in particular in FIG. 7.

The wheels 7A, 7B, 7C, and 7D facilitate moving the coupling device 1 longitudinally along the rail 2 so that the user needs only to push with minimal effort against the coupling device 1 in order to cause the coupling device 1 to move.

Nevertheless, having recourse to wheels is merely a preferred technical option amongst others, the essential point being that the tribological nature of the contact between the device 1 and the rail 2 is more favorable to the device 1 moving longitudinally along the rail 2 when the support member 7 is in its in-use configuration than when it is in its rest configuration. For example, instead of using wheels 7A, 7B, 7C, and 7D, it is entirely possible to envisage having recourse to skids that slide, thereby forming a skid set to enable the coupling device 1 to slide on the rail 2 when the support member 7 is in its in-use configuration.

The main body 5 carries the attachment means 6 and the support member 7, i.e. both the attachment means 6 and the support member 7 are mounted on the main body 5. As shown in the figures, the support member 7 is mounted to move relative to the main body 5 between a rest position (shown in FIG. 1), corresponding to the rest configuration, and an in-use position (shown in FIG. 7) corresponding to the in-use configuration.

Preferably, the main body 5 is designed to rest on the rail 2 when the support member 7 is in the rest configuration, the support member 7 itself being designed to exert a force on the rail 2 on passing from its rest configuration to its in-use configuration that enables the main body 5 to be moved away from the rail 2, and for example to lift the main body 5 to a distance above and away from the rail 2, and more precisely from its outside face 21D. Thus, by means of the support member 7 that bears directly via the wheels 7A, 7B, 7C, and 7D on the rail 2, the coupling device 1 generates a thrust force that lifts the main body 5 substantially in the vertical direction Z-Z', the main body 5 then no longer being in contact with the rail 2, so that the weight of the coupling device 1 is taken up by the support member 7.

This technical measure makes it possible to obtain a coupling device 1 of construction that is particularly simple, compact, and robust, limiting the number of parts to a minimum, since it is the support member 7 itself, specifically via the wheels 7A, 7B, 7C, and 7D, that serves to transfer the weight of the coupling device 1 from the main body 5 to the support member 7 by putting the main body 5 out of contact with the rail 2.

Advantageously, the support member 7 is mounted to move in translation on the main body 5 between its rest position and its in-use position. In this advantageous embodiment, the support member 7 thus preferably includes at least one carriage, or in even more preferred manner, as in the variant of FIGS. 1 to 8, two carriages 8 and 9, each of which is mounted to move in translation on the main body 5 between a retracted position (shown in FIG. 1) corresponding to the support member 7 being in its rest position, and an extended position (shown in FIG. 7) corresponding to the support member 7 being in its in-use position. Advantageously, each carriage 8, 9 is mounted to move in translation on the main body 5 in the vertical direction Z-Z'. Each carriage 8, 9 may be mounted to move in translation on the main body 5 by any known means enabling a slideway connection to be achieved between the main body 5 and the carriage 8, 9. Preferably, as shown in the figures, each carriage 8, 9 carries a respective pair of the wheels 7A, 7B, 7C, and 7D, the coupling device 1 thus having two wheel sets, each located towards one of its ends in the longitudinal direction X-X'. Each wheel set is constituted by a carriage 8, 9 and two of the wheels 7A, 7B, 7C, and 7D mounted to rotate freely on the corresponding carriage 8, 9, with the carriage sliding vertically on the main body 5. For example, each pair of wheels is mounted on a common axle that is mounted to rotate relative to the corresponding carriage and that extends substantially parallel to the transverse direction Y-Y'.

Such a construction, involving no more than the support member 7 being mounted to move in translation relative to the main body 5, is particularly advantageous since it presents the characteristics of being extremely reliable, robust, and inexpensive.

Figure 9:
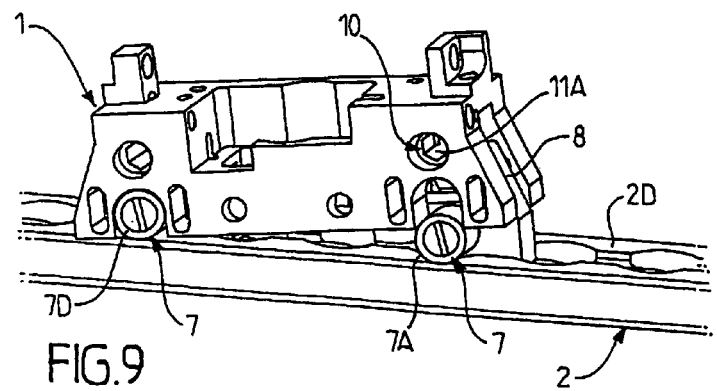
FIG. 9 is a diagrammatic perspective view showing a coupling device in accordance with a second embodiment of the invention and with its support member shown in the in-use configuration.

In the variant of FIGS. 1 to 8 as described above, the two carriages 8 and 9 together lift the main body 5 so that it conserves its orientation. Nevertheless, as shown in FIG. 9, it is entirely possible to envisage one of the carriages 8 being mounted stationary relative to the main body 5, which main body is then lifted only by the other carriage 9, thereby causing the wheels of the first carriage 8 to come into contact with the rail 2, thus allowing the device 1 to run on its wheels. As another variant (not shown), it is also possible to envisage all of the wheel sets 7A, 7B, 7C, and 7D being mounted in fixed position on the main body 5, with the main body being also provided with a soleplate that is mounted to move in vertical translation between a deployed bearing position in which the soleplate bears against the rail 2 to support the weight of the device 1 and put the wheels out of contact with the rail, and a retracted position in which the soleplate allows the wheels to come into contact with the rail 2 and support the weight of the device 1.

Advantageously, when in its extended position, each carriage 8, 9 is designed to extend inside the opening 3 formed longitudinally in the rail 2 so as to provide longitudinal guidance to the coupling device 1 as it moves along the rail 2. This technical measure thus serves to avoid untimely derailing of the coupling device 1 when it is running along the rail 2. This guidance provided by each carriage 8, 9 also contributes to improving the ability of the coupling device 1 to withstand any lateral forces that might be applied thereto.

It is also possible to envisage the device 1 being provided with vertical retaining means to prevent the device 1 from moving vertically away from the rail 2 while it is running (or sliding) on and along the rail 2. Such vertical retaining means are thus designed to vary between an activated configuration in which they attach the coupling device 1 to the rail 2, while allowing the device 1 to move longitudinally along the rail 2, and a deactivated configuration in which they allow the device 1 to be freely separated from the rail 2.

Advantageously, the coupling device 1 has first control means 10 designed to be actuated, preferably manually, by a user so as to enable the user to cause the support member 7 to go from its rest configuration to its in-use configuration. Advantageously, the first control means 10 also serve to cause the support member 7 to pass conversely from its in-use configuration to its rest configuration, i.e. the first control means are then reversible.

By way of example, and as shown in the figures, the first control means 10 advantageously comprise a rotary cam 11 (and preferably two rotary cams 11 and 12 in the variant of FIGS. 1 to 8) co-operating with the carriage 8 (or respectively with the carriages 9 in the variant of FIGS. 1 to 8) to cause it/them to vary between the retracted position and the extended position.

By way of example, each cam 11, 12 is mounted to pivot relative to the main body 5 about an axis that is preferably substantially parallel to the transverse direction Y-Y'.

Preferably, each rotary cam 11, 12 is provided with a corresponding polygonal socket 11A, 12A that is designed to receive the head of a driver tool (e.g. a hex key) enabling the user to pivot the corresponding cam 11, 12 and thus move the corresponding carriage 8, 9 and the wheels 7A, 7B, 7C, and 7D carried thereby to be moved in vertical translation. Advantageously, each cam 11, 12 is shaped to co-operate with a complementary surface of the corresponding carriage 8, 9 so that the retracted position is a position of stable equilibrium while the extended position is a position of unstable equilibrium, with the retracted position advantageously being a return position under the effect of the weight of the device 1.

Using a system of pivoting cams 11, 12 for moving the wheels 7A, 7B, 7C, and 7D in translation is found to be particularly advantageous in that it makes it possible to provide force multiplication that is most welcome when heavy equipment is fastened to the coupling device 1, i.e. when passing from the rest configuration to the in-use configuration requires the user to lift all or part of the weight of the equipment in question.

The attachment means 6 and the support member 7 are designed to vary between their respective configurations (i.e. the attachment and release configurations for the attachment means 6 and the rest and in-use configurations for the support member 7) independently of each other. This means that the attachment means 6 and the support member 7 are controlled separately, i.e. independently of each other. In this way, it is possible for the user to act on the configuration of the attachment means 6 without that influencing the configuration of the support member 7, and vice versa.

This technical characteristic, which consists in separating drive for the attachment means 6 and for the support member 7, enables the coupling device in accordance with the invention to be given an architecture that is particularly simple and easy to use. Such an architecture also makes it possible to provide certain advantageous functions, such as, for example, a function of adapting the coupling device 1 to a specific shape of rail 2, as described in greater detail below.

Separating the operation of the attachment means 6 and of the support member 7 also provides better safety in use, since the user can then concentrate on each operation, and in particular on the attachment operation (putting the attachment means 6 into the attachment configuration) without any direct functional connection between the attachment means 6 and the support member 7 disturbing the user's perception of the operation of the attachment means 6 and/or the support member 7.

Thus, in the advantageous embodiment shown in the figures, the coupling device 1 has second control means 13 designed to be actuated by the user in order to enable the user to cause the attachment means 6 to go from their release configuration to their attachment configuration, the second control means 13 being distinct from the first control means 10, i.e. making it possible, as mentioned above, to control the passage of the attachment means 6 from their attachment configuration to their release configuration, and vice versa in completely independent manner, without interacting directly with the support member 7.

Advantageously, by varying their size in the transverse direction Y-Y' defined relative to the longitudinal direction X-X' in which the rail 2 extends, the attachment means 6 are designed to vary between firstly a retracted configuration (shown in FIG. 5) enabling them to be inserted through an opening provided in the surface of the rail 2, i.e. specifically the opening 3, and secondly a deployed configuration (shown in FIG. 6) that prevents the attachment means 6 from being extracted through said opening 3, thus enabling the coupling device 1 to be secured to the rail 2. In other words, the locking function provided by the attachment means 6 is obtained by increasing the size it occupies in the radial direction (defined relative to the vertical direction Z-Z'), the position of the attachment means 6 advantageously remaining stationary along the longitudinal direction X-X'. This embodiment variant is thus based on changing the shape of the anchor means 6 in order to achieve locking, it being understood that the locking function could be provided by any other means known in the field, and for example on the basis of the principles set out in French patent application FR-02/02964 in the name of the same Applicant.

Figure 4:
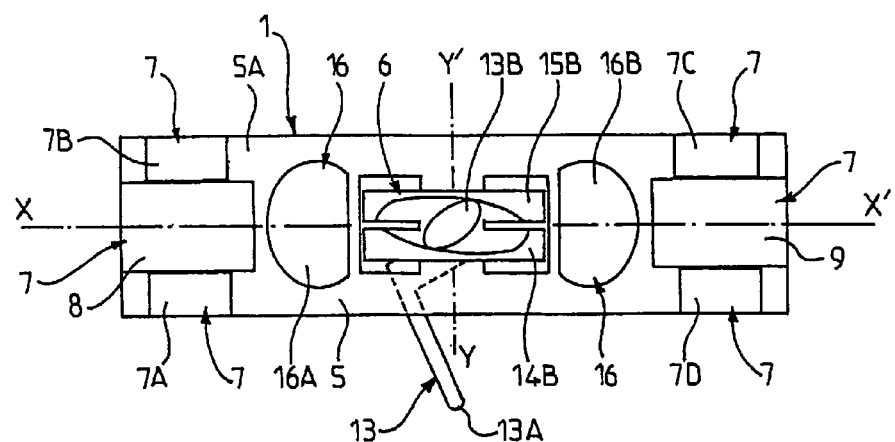
FIG. 4 is a diagrammatic view from beneath showing the device of FIGS. 1 to 3 with its attachment means in the release configuration.

In the embodiment variants shown in the figures (see in particular FIGS. 4 to 6), causing the attachment means 6 to pass from the release configuration to the attachment configuration corresponds to increasing the transverse size (in the direction Y-Y') of said attachment means 6, thereby making it possible to provide an anchor within the inside volume 4, which anchor is of transverse size that is sufficient to prevent it from passing through the opening 3, thereby ensuring that the coupling device 1 is prevented from moving relative to the rail 2 in the vertical direction Z-Z'. Preferably, and as shown in FIGS. 4 to 6, the attachment means 6 include at least one first blocking surface 14 that, when the attachment means 6 pass from the release configuration to the attachment configuration, moves so as to exert bearing pressure against the inside face 20D of the attachment wall 2D, so that the attachment wall 2D is clamped between the first locking surface 14 and the main body 5 (when the support member 7 is in the rest configuration), so as to provide an anti-vibration mechanical connection between the coupling device 1 and the rail 2. Preferably, the attachment means 6 have a plurality of blocking surfaces. Thus, in the variants shown in the figures, the attachment means 6 have two blocking surfaces 14 and 15. By way of example, each blocking surface 14, 15 is provided with a flat that is inclined relative to the inside face 20D and that slides on passing from the release configuration to the attachment configuration against the inside face 20D parallel to the outside face 21D, thereby pressing against the inside face 20D because of its inclined shape and thus preventing any slack to exist between the rail 2 and the coupling device 1. Each inclined flat of the blocking surfaces 14 and 15 thus acts a like a wedge that pushes vertically against the inside face 20D so as to achieve a lash-free mechanical connection between the coupling device 1 and rail 2 in a manner that is simple and inexpensive, this lash-free connection serving to obtain an anti-vibration effect. In the particularly advantageous embodiments shown in the figures, the attachment means 6 comprise two arms 14A and 15A mounted to move in translation in the transverse direction Y-Y', each arm 14A, 15A carrying a corresponding part 14B, 15B that is shaped to provide the blocking surface 14, 15. Preferably, and as shown in particular in FIG. 4, the second control means 13 comprise a lever 13A pivotally mounted on the main body 5 about an axis parallel to the vertical direction Z-Z'. Advantageously, the second control means 13 also comprise a cam 13B that is turned, preferably directly, by the lever 13A, said cam 13B interacting with each of the parts 14B and 15B so as to cause the blocking surfaces 14 and 15 to move in translation. More precisely, the cam 13B preferably acts simultaneously on both parts 14B and 15B so as to cause said parts to move apart mutually in the direction Y-Y'. One such construction is described in detail in patent application FR-07/01318 in the name of the same Applicant.

Preferably, the attachment means 6 are thus constructed in the same manner as the "anchor means" described in above-mentioned application FR-07/01318, the content of which is incorporated herein by reference.

The combination of such attachment means 6 with the support member 7 is particularly advantageous since it enables the user to adjust the longitudinal position of the coupling device 1 along the rail 2 very easily, with little effort and in reliable manner, while also benefiting from effective anti-vibration locking.

In the variant described above, the attachment means 6 enable the coupling device 1 to be secured to the rail 2 and they prevent substantially any movement of the coupling device 1 relative to the rail 2 in the vertical direction Z-Z'.

Longitudinal blocking of the coupling device 1 is preferably provided by distinct means. In this respect, the coupling device 1 preferably includes an immobilizer element 16 designed to vary between a blocking position in which it is designed to engage in an opening formed in the surface of the rail 2, specifically in a cell 3A, thereby substantially preventing any movement in translation of the device 1 parallel to the mean plane in which the longitudinal extension direction X-X' of the rail 2 lies, and a disengagement position in which it is designed to be situated outside said opening 3A so as to enable the device 1 to move in translation at least in the longitudinal direction X-X' in which the rail 2 extends.

For example, in the embodiment shown in the figures, the immobilizer element 16 comprises one, and preferably two shoes 16A, 16B of shape that is advantageously substantially complementary to the shape of the cell-forming opening portions 3A of enlarged section.

Said shoes 16A and 16B are designed to be inserted in respective cells in lash-free manner so as to prevent substantially any movement of the coupling device 1 relative to the rail 2, whether longitudinally (i.e. in the direction X-X') or transversely (i.e. in the direction Y-Y'). Preferably, the immobilizer element 16 is secured to the main body 5, and for example is mounted in stationary manner on the bottom face 5A of the main body 5 that is to come into contact with the rail 2. Advantageously, the immobilizer element 16 is secured to the main body 5 in such a manner that when the support member 6 is in the rest position, the immobilizer element 16 adopts its blocking position (i.e. it interacts with a cell 3A to prevent the coupling device 1 from moving in horizontal translation), and when, on the contrary, the support member 7 is in its in-use position, then the immobilizer element 16 adopts its disengaged position, i.e. the shoes 16A and 16B then lie outside the cells 3A, above them, thus allowing the coupling device 1 to move horizontally along the rail 2.

Advantageously, the coupling device 1 includes means for adjusting the position of the attachment means 6 in the vertical direction Z-Z' (which direction is perpendicular both to the longitudinal direction X-X' in which the rail 2 extends and to the transverse direction Y-Y'). In other words, the adjustment means (not shown) enable the distance between the bottom face 5A of the main body 5 and the blocking faces 14 and 15 to be adjusted so as to make it possible to fit the coupling device 1 to rails 2 of any dimensions. In this respect, the decoupling between the control over the support member 7 and the control over the attachment means 6 is naturally most advantageous.

The operation of the coupling device 1 in accordance with the invention is described below.

Figure 1:
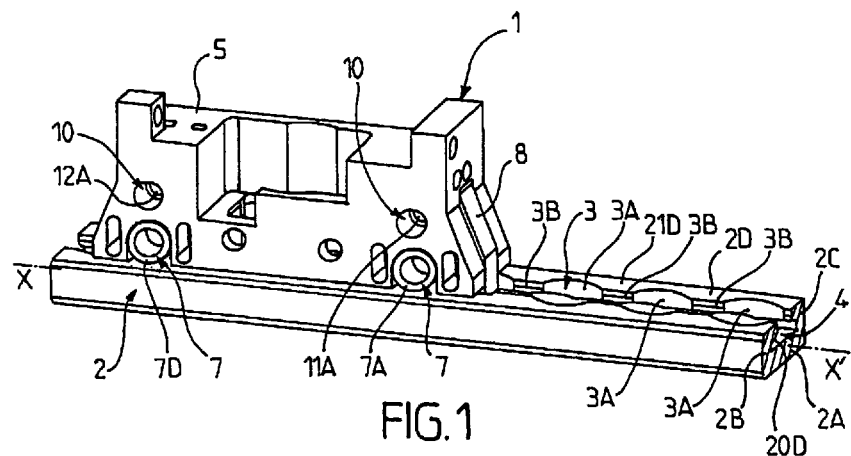
FIG. 1 is a diagrammatic perspective view showing a coupling device in accordance with a first embodiment of the invention and with its support member in a rest configuration.
Figure 2:
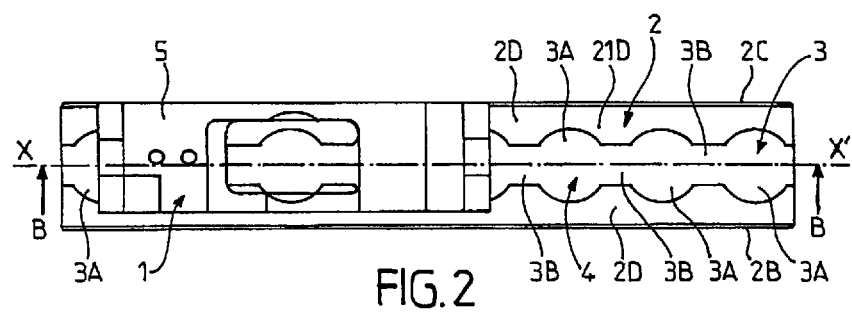
FIG. 2 is a diagrammatic plan view showing the FIG. 1 coupling device.
Figure 3:
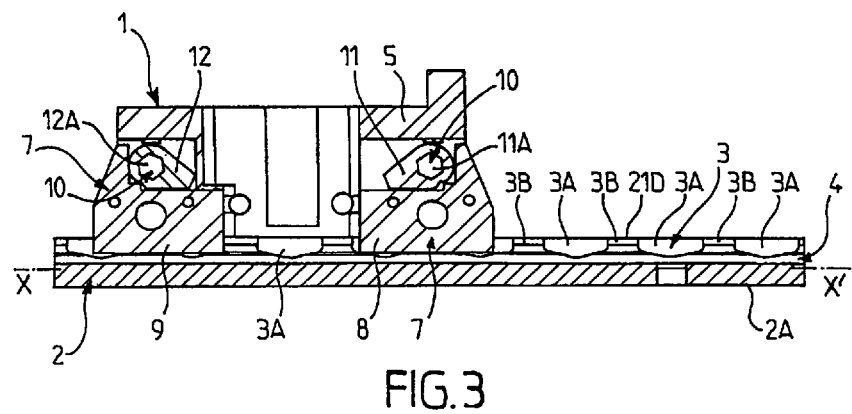
FIG. 3 is a diagrammatic section view on line B-B showing the FIG. 2 device.

The coupling device 1 is initially in a rest state, ready for being put into place. In the rest state, the attachment means 6 are in the release configuration (as shown in FIGS. 4 and 5), while the support member 7 is in the rest configuration (as shown in FIG. 1). In the rest configuration, the wheels 7A, 7B, 7C, and 7D are Advantageously retracted into the volume of the main body 5, as shown in FIG. 1, so that the coupling device 1 presents a configuration that is particularly compact and robust. By way of example, the main body 5 is fastened to an on-board kitchen element that the user seeks to secure to the floor of an airplane having the rail 2 fastened thereto.

The user then puts the coupling device 1 on the rail 2 so as to cause the inside face 5A of the main body 5 to rest on the outside face 21D. The coupling device 1 is then ready to be locked to the rail 2, without it being necessary to begin by causing the support member 7 to take on its in-use configuration. However, if the longitudinal position of the coupling device 1 relative to the rail 2 is not satisfactory, the user then actuates the cams 11 and 12, specifically by means of a hex key, so as to push each of the carriages 8 and 9 downwards in the vertical direction Z-Z'. Under the effect of the carriages 8 and 9 moving, each pair of wheels 7A, 7B, 7C, and 7D comes to bear against the outside face 21D of the rail 2, which by reaction causes the main body 5 to be lifted (together with the on-board kitchen element carried thereby), above the rail 2 so as to be spaced about therefrom.

At this instant, the weight of the coupling device 1 and of the kitchen element carried thereby is supported by the wheels 7A, 7B, 7C, and 7D.

It then suffices for the user to exert longitudinal thrust on the coupling device 1 (e.g. on the main body 5 or on the on-board cooking element carried thereby) to cause the coupling device 1 to run along the rail 2 to a satisfactory position. Once this satisfactory position has been reached, the user uses the hex key to turn the cams 11 and 12 in the opposite direction so as to return each carriage 8, 9 into its retracted position under the effect of the weight of the coupling device 1. This has the effect of lowering the main body 5 back down onto and against the rail 2, thereby engaging the shoes 16A and 16B in two cells 3A. At this instant, the position of the coupling device 1 in the (horizontal) plane in which the rail 2 extends is thus set by co-operation between the shoes 16A and 16B and the corresponding cells 3A. Thereafter, the user proceeds finally to secure the coupling device 1 to the rail 2 by turning the lever 13A. Turning the lever 13A in this way about an axis parallel to the vertical axis Z-Z' causes the cam 13B to turn, which in turn pushes the parts 14B and 15B outwards. At this instant, it is possible that the distance between the bottom face 5A and the blocking faces 14 and 15 is not sufficient, given the shape of the rail 2, such that the parts 14B and 15B then come into collision with the side faces of the rail 2 without achieving the desired locking. The user will naturally be aware of this situation since it prevents the user from closing the lever 13A fully. All that is then required is to act on the means for adjusting the position of the attachment means 6 in the vertical direction Z-Z' so as to lower the parts 14B and 15B, i.e. increase the distance between the blocking faces 14 and 15 and the bottom face 5A of the main body 5. Once this adjustment operation has been performed, the lever 13A can be pushed fully home so that the blocking faces 14 and 15 engage the wall 20D of the rail 2 in such a manner as to lock the coupling device 1 completely relative to the rail 2.

The invention claimed is:

1. A coupling device (1) for coupling to a longitudinal rail (2) on board a vehicle, said device (1) comprising:
   a main body (5);
   a support member (7) mounted to the main body (5);
   an attachment (6) carried by the main body (5) and configured to vary between
     firstly an attached configuration in which the attachment (6) attaches the coupling device (1) to said rail (2) by engaging an opening (3) in an outside face of said rail (2), and
     secondly a release configuration in which the attachment (6) allows said coupling device (1) and said rail (2) to be separated;
   wherein the support member (7) and the main body (5) are movably mounted relative to each other, and are configured to move between
     firstly an in-use configuration in which the main body (5) is moved away from said rail (2) while the support member (7) is in contact with said outside face of the rail (2) and the support member (7) is interposed between the rail (2) and the main body (5) so as to support at least a fraction of the weight of said coupling device (1) on the rail (2), allowing the coupling device (1) to move longitudinally along the rail (2) while being at least fractionally supported by the support member (7), and
     secondly a rest configuration in which the support member (7) and the main body (5) rest on the outside face of the rail (2) such that the weight of the coupling device (1) is supported on the rail (2) by the main body (5), and the support member (7) substantially does not support the weight of said coupling device (1) on the rail (2),
   wherein the attachment (6) is configured to vary between its attached and release configurations independently of the support member (7) and the main body (5) moving between the in-use and rest configurations.

2. A device (1) according to claim 1, characterized in that the support member (7) is designed to support substantially all of the weight of the coupling device (1) when in the in-use configuration.

3. A device (1) according to claim 2, characterized in that said support member (7) comprises at least one wheel (7A, 7B, 7C, 7D) so that the coupling device (1) can run on the rail (2) when the support member (7) and main body are in the in-use configuration.

4. A device (1) according to claim 2, characterized in that the main body (5) is configured to rest on the rail (2) and, when the support member (7) moves from its rest configuration to its in-use configuration, to exert a force on the rail (2) that moves the main body apart from the rail (2).

5. A device (1) according to claim 2, characterized in that it includes an immobilizer element (16) configured to vary between firstly a blocking position in which it is configured to engage in an opening (3A) formed in a surface of the rail (2) substantially to prevent any movement in translation of the device (1) parallel to a mean plane in which a longitudinal direction (X-X') of the rail (2) lies, and secondly a disengaged position in which it is situated outside said opening (3A) to enable the device (1) to move in translation at least in the longitudinal direction (X-X') in which the rail (2) extends.

6. A device (1) according claim 2, characterized in that it includes a first control (10) configured to be actuated by a user to enable the user to cause the support member (7) and the main body (5) to move from the rest configuration to the in-use configuration.

7. A device (1) according to claim 6, characterized in that it includes second control (13) configured to be actuated by a user in order to enable the user to cause the attachment (6) to vary from its release configuration to its attached configuration, said second control (13) being distinct from the first control (10).

8. A device (1) according to claim 1, characterized in that said support member (7) comprises at least one wheel (7A, 7B, 7C, 7D) so that the coupling device (1) can run on the rail (2) when the support member (7) is in the in-use configuration.

9. A device (1) according to claim 8, characterized in that the support member (7) comprises at least one carriage (8, 9) mounted to move the support member (7) and the main body (5) between a retracted rest position and an extended in-use position, said device (1) including a pivotable cam (11, 12) cooperating with the carriage (8, 9) and the main body (5) to cause them to move between the retracted rest position and extended in-use position.

10. A device (1) according to claim 1, characterized in that the main body (5) is configured to rest on the rail (2) and, when the support member (7) moves from its rest configuration to its in-use configuration, the support member (7) exerts a force on the rail (2) to move the main body (5) apart from the rail (2).

11. A device (1) according to claim 1, further comprising an immobilizer element (16) configured to engage in an opening (3A) formed in a surface of the rail (2).

12. A device (1) according to claim 11, wherein the immobilizer element (16) is secured to the main body (5) in such a manner that when the support member (7) and main body (5) are in the rest configuration, the immobilizer element (16) engages in said opening (3A) substantially to prevent any movement in translation of the device (1) parallel to a mean plane in which a longitudinal extension direction (X-X') of the rail (2) lies, and when the support member (7) and main body 5 are in the in-use configuration, the immobilizer element (16) is situated outside said opening (3A) to enable the device (1) to move in translation at least in the longitudinal direction (X-X') in which the rail (2) extends.

13. A device (1) according claim 1, characterized in that it includes first control (10) configured to be actuated by a user to enable the user to cause the support member (7) and the main body to move from the rest configuration to the in-use configuration.

14. A device (1) according to claim 13, characterized in that it includes second control (13) configured to be actuated by a user in order to enable the user to cause the attachment (6) to vary from its release configuration to its attached configuration, said second control (13) being distinct from the first control (10).

15. A device (1) according to claim 1, characterized in that a size of the attachment (6) in a transverse direction (Y-Y') defined relative to a longitudinal direction (X-X') in which the rail (2) extends is configured to vary between firstly a retracted size enabling it to be inserted through an opening (3) formed in a surface of the rail (2), and secondly a deployed size preventing the attachment (6) from being extracted through said opening (3).

16. A device (1) according to claim 15, characterized in that it includes an adjustment for adjusting a position of the attachment (6) in a vertical direction (Z-Z') perpendicular both to the longitudinal direction (X-X') in which the rail extends and to said transverse direction (Y-Y').

17. A device (1) according claim 1, characterized in that it constitutes a device (1) for coupling to a rail (2) on board an aircraft.

* * * * *